Patented June 22, 1943

2,322,571

UNITED STATES PATENT OFFICE 2,322,571

MODIFIED VINYL PLASTIC

Brook J. Dennison, Aspinwall, Pa., assignor to Pittsburgh Plate Glass Company, Allegheny County, Pa., a corporation of Pennsylvania No Drawing. Application April 25, 1941, Serial No. 390,345

3 Claims. (Cl. 260—36)

The present invention relates to vinyl plastics and more particularly to polyvinyl resins modified by the inclusion therewith of glyceryl alpha, gamma, dialkyl ethers.

One object of the invention is the provision of polyvinyl resins having improved flexibility and elasticizing properties.

Other objects and advantages of the invention will become more apparent from the following detailed description of certain preferred embodiments thereof.

Vinyl plastics are widely used in the preparation of lacquers, films, bands, filaments or threads, and the like. The polyvinyl esters, and particularly polyvinyl acetals, have been used to form the reinforcing interlayers of laminated glass. It is, however, necessary to incorporate one or more modifying agents with the vinyl resins in order to impart thereto properties adapting them for commercial application. For example, when the vinyl resins are to be used in the manufacture of laminated glass, the plastic must remain flexible at low temperatures and yet retain its strength and elasticity at high temperatures.

It has been ascertained that the glyceryl alpha, gamma, dialkyl ethers in which the alkyl radicles contain from 4 to 6 carbon atoms are especially suited as plasticizers for the polyvinyl acetal resins and at the same time serve generally to plasticize other vinyl plastics, such as vinyl acetate, vinyl chloride, and the like.

Polyvinyl acetal resins are prepared by reacting polyvinyl alcohol with an aldehyde in the presence of a condensation catalyst or by hydrolyzing a polyvinyl aliphatic ester and subsequently combining the hydrolyzed product with an aldehyde. Straight chain, saturated, aliphatic aldehydes, including acetaldehyde, propionaldehyde, and butyraldehyde, are commonly employed in the formation of the vinyl acetal resins. These and the other vinyl-type resins are so well-known today that elaborate details as to their production are not necessary.

The following examples are illustrative of the glyceryl ethers contemplated for use in modifying the vinyl-type resins:

*Example 1*

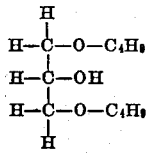

*Example 2*

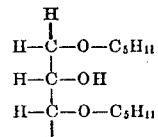

*Example 3*

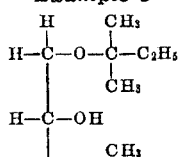

*Example 4*

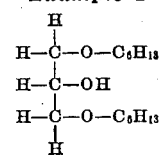

The alkyl radicle should contain not less than 4 carbon atoms, since lower glyceryl ethers are water soluble, and not more than 6 carbon atoms, since higher glyceryl ethers are less compatible with the vinyl resins.

The proportion of plasticizer to resin will vary within relatively wide limits depending, of course, upon the use to be made of the resin. Where the resin is to be employed as the reinforcing interlayer of laminated glass, it must meet exacting requirements as to strength over a temperature range of from —20° F. to 120° F., adhesion, durability and freedom from moisture attack. The following examples are illustrative of suitable mixtures:

|   | Per cent |
|---|---|
| 1. Polyvinyl acetal resin | 74 |
|    Glyceryl alpha, gamma, dibutyl ether | 26 |
| 2. Polyvinyl acetal resin | 70 |
|    Glyceryl alpha, gamma, di-hexyl ether | 30 |
| 3. Polyvinyl acetal resin | 68 |
|    Glyceryl alpha, gamma, di-amyl ether | 32 |
| 4. Polyvinyl butyral resin | 67 |
|    Glyceryl alpha, gamma, di-isoamyl ether | 33 |
| 5. Vinyl acetate | 72 |
|    Glyceryl alpha, gamma, diamyl ether | 28 |
| 6. Vinyl chloracetate | 70 |
|    Glyceryl alpha, gamma, di-isoamyl ether | 30 |

Laminated glass in which the plastic interlayer contains less than 26% by weight of the glyceryl ether plasticizer does not give satisfactory break tests at 0° F., and where the plastic layer contains more than 40% by weight of the plasticizer the break tests at 120° F. are unsatisfactory.

In a similar manner, films or sheets of the polyvinyl acetal resin when containing less than 26% by weight of the glyceryl ether plasticizer have a low percentage of elongation before rupture and tend to become brittle and unelastic. Sheets containing over 40% by weight of the plasticizer lose their toughness and elasticizing properties and are inclined to flow.

The resin and plasticizer may be blended readily by placing both ingredients in solution or an aqueous suspension may be agitated to insure proper mixing. The plasticized resin may be formed into sheets in any suitable manner as by casting from solution, matt-screening the suspension or by extruding an homogeneous mixture of resin and plasticizer.

If it is desired the glyceryl ether plasticizers may be modified by the incorporation therewith of other plasticizers. Triethylene glycol dihexoate, dibutyl and diamyl phthalates, and dibutyl phosphate may be employed for this purpose. Again the glyceryl ethers may be used in various combinations with themselves.

It will be obvious that various modifications may be resorted to and different embodiments added without departing from the spirit of my invention or the scope of the appended claims.

What I claim is:

1. A modified vinyl plastic comprising a polyvinyl butyral resin and approximately 33 percent by weight of glyceryl alpha, gamma di-isoamyl ether.

2. A modified vinyl plastic composition comprising about 67 to 74% of polyvinyl acetal resin, the remainder of the composition being essentially glyceryl alpha, gamma dialkyl ether, in which the alkyl radicles each contain from 4 to 6 carbon atoms.

3. A modified vinyl plastic composition comprising about 67 to 74% of polyvinyl butyral resin, the remainder of the composition being essentially glyceryl alpha, gamma dialkyl ether, in which the alkyl radicles each contain from 4 to 6 carbon atoms.

BROOK J. DENNISON.